(12) United States Patent
Cetin et al.

(10) Patent No.: US 9,047,515 B2
(45) Date of Patent: Jun. 2, 2015

(54) METHOD AND SYSTEM FOR WILDFIRE DETECTION USING A VISIBLE RANGE CAMERA

(75) Inventors: Ahmet Enis Cetin, Ankara (TR); Osman Gunay, Ankara (TR)

(73) Assignee: Delacom Detection Systems LLC, Sarasota, FL (US)

( * ) Notice: Subject to any disclaimer, the term of this patent is extended or adjusted under 35 U.S.C. 154(b) by 603 days.

(21) Appl. No.: 13/825,003

(22) PCT Filed: Sep. 13, 2010

(86) PCT No.: PCT/US2010/048685
§ 371 (c)(1),
(2), (4) Date: Sep. 4, 2013

(87) PCT Pub. No.: WO2011/032117
PCT Pub. Date: Mar. 17, 2011

(65) Prior Publication Data
US 2013/0336526 A1    Dec. 19, 2013

Related U.S. Application Data

(60) Provisional application No. 61/241,958, filed on Sep. 13, 2009.

(51) Int. Cl.
| | | |
|---|---|---|
| *G06K 9/00* | (2006.01) | |
| *G06K 9/40* | (2006.01) | |
| *G08B 17/00* | (2006.01) | |
| *G08B 17/12* | (2006.01) | |
| *G06T 7/00* | (2006.01) | |
| *G06T 7/20* | (2006.01) | |

(52) U.S. Cl.
CPC ........ *G06K 9/00657* (2013.01); *G06K 9/00147* (2013.01); *G08B 17/005* (2013.01); *G08B 17/125* (2013.01); *G06T 7/0083* (2013.01); *G06T 7/2053* (2013.01); *G06T 2207/10016* (2013.01); *G06T 2207/20081* (2013.01); *G06T 2207/30232* (2013.01)

(58) Field of Classification Search
USPC .......................... 382/103, 155–161, 254–275
See application file for complete search history.

(56) References Cited

U.S. PATENT DOCUMENTS

| 6,487,303 | B1 * | 11/2002 | Yamaguchi et al. | 382/103 |
|---|---|---|---|---|
| 2003/0165258 | A1 * | 9/2003 | Kubota et al. | 382/113 |
| 2004/0213459 | A1 * | 10/2004 | Ishimaru et al. | 382/191 |
| 2005/0117781 | A1 * | 6/2005 | Aoyama | 382/103 |
| 2006/0115154 | A1 * | 6/2006 | Chen | 382/181 |
| 2008/0137906 | A1 * | 6/2008 | Chang et al. | 382/100 |
| 2013/0336526 | A1 * | 12/2013 | Cetin et al. | 382/103 |
| 2014/0099020 | A1 * | 4/2014 | Ko et al. | 382/159 |

* cited by examiner

*Primary Examiner* — Alex Liew
(74) *Attorney, Agent, or Firm* — Whitham, Curtis, Christofferson & Cook, P.C.

(57) ABSTRACT

Wildfires are detected by controlling image scanning within the viewing range of a video camera to generate digital images that are analyzed to detect gray colored regions, and then to determine whether a detected gray colored region is smooth. Further analysis to determine movement in a gray colored smooth region uses a past image which is within a slow moving time range, as determined by a strategy for controlling the image scanning. Additional analysis connects a candidate region to a land portion of the image, and a support vector machine is applied to a covariance matrix of the candidate region to determine whether the region shows smoke from a wildfire.

20 Claims, 4 Drawing Sheets

METHOD AND SYSTEM FOR WILDFIRE DETECTION USING A VISIBLE RANGE CAMERA

BACKGROUND OF THE INVENTION

1. Field of the Invention

The present invention generally relates to detection of wildfires, and in particular to use of analysis of visible range camera sensors to determine the presence of wildfires.

2. Background Description

The prior art of relevance to detection of wildfires includes the following references:

United States Patent Publication No. 2005/0001729 for "System and method for fire detection" to William R. Garmer et al. ("Garmer '729 application") dated Jan. 6, 2005, describes a system based on detecting electromagnetic radiation with a flicker frequency less than 10 Hz due to flames. On the other hand, smoke arises first in wildfires and become visible over the trees or bush from long distances. Smoke does not flicker as flames, therefore flicker frequency analysis will not help to distinguish smoke from other sources of electromagnetic energy. Obviously smoke is not an energy source. Therefore, the Garmer '729 application cannot detect smoke.

U.S. Pat. No. 7,256,401 for "System and method for fire detection" to Garmer, et al. ("Garmer '401") issued Aug. 14, 2007, also uses a sensor detecting electromagnetic radiation. Unfortunately, flames are not visible in early stages of fire because the fire starts from the ground and as a result infrared radiation is not detectable at the very early stage of the fire.

United States Patent Publication No. 2008/0309502 by Henri Boccia et al. ("Boccia '502") dated Dec. 18, 2008, describes a system in which sensors are installed in trees. Sensors detect fires in the vicinity and inform neighboring sensors which in turn produces an alarm. To cover larger forests with ordinary temperature sensors would be very costly.

U.S. Pat. No. 7,164,468 to Correia Da Silva Vilar, et al. issued Jan. 16, 2007 and United States Patent Publication No. 2008/0198025 by Pedro Manuel Cordoso Vieira et al. dated Aug. 21, 2008 use the laser radar LIDAR and optical spectroscopy for wildfire detection. These are expensive technologies.

U.S. Pat. No. 7,541,938 to Engelhaupt issued Jun. 2, 2009 describes a flame detection method. Similarly, U.S. Pat. No. 7,123,154 to Smith issued Oct. 17, 2006 uses UV sensors for flame detection. Neither of these references involve smoke detection.

U.S. Pat. No. 7,460,056 to Rivas et al. issued on Dec. 2, 2008 uses a radar based sensor for wild fire detection. A radar is more expensive than a regular PTZ camera.

What is needed is a system that will detect a wild fire at an early stage of the fire's development, and do so using relatively inexpensive sensor equipment.

SUMMARY OF THE INVENTION

It is therefore an object of the present invention to provide a system for detecting a wild fire at an early stage of the fire's development using relatively inexpensive sensor equipment.

An aspect of the invention is a method and a system for wildfire detection using a visible range pan-tilt-zoom camera continuously scanning the 360 degree viewing angle by: employing an edge detector for determining gray colored smooth regions in the current image of the video generated by the pan-tilt-zoom camera, determining if the gray colored region is a moving region in video, segmenting the current image of the video into the sky and the land regions, and checking if the moving region is in the sky region or touches said land regions of the image, and using a support vector machine based decision making algorithm.

In another aspect, the method and system provide for defining the smooth region as a region with small pixel value transitions which are determined as regions in which an image edge detector cannot detect any significant edges. In a further aspect of the invention a Sobel operator is used for edge detection. Also, a gray region in an image may be defined as a region whose pixel chrominance values are close to zero in the Y-Cb-Cr color space. In another aspect, the pan-tilt-zoom camera automatically stops whenever a gray colored smooth region is detected in the current image of the video. In yet another aspect the consecutive images of the video are subtracted from each other to determine if the gray colored smooth region is moving or not. In a further aspect of the invention a support vector machine determines if a region is smoke or not based on the color, motion and edge parameters estimated from the video.

In another aspect, the method and system for wildfire detection is implemented using a visible range pan-tilt-zoom camera. In this implementation, smoke is detected by comparing the current image of the parking position of the pan-tilt-zoom camera with a previous image, and determining a difference image. An edge detector is employed for determining gray colored smooth regions in the current image. The current image of the video is segmented into sky and land portions, and a check is made to determine if the moving region is in the sky region or touches the land portions of the image. A support vector machine based decision making algorithm is used to determine if smoke is present.

In another aspect of the invention the pan-tilt-zoom camera scans the surrounding area by visiting user defined parking positions. It is also an aspect of the invention to determine moving regions by taking the difference between the mean values of blocks of the current image of the video and the mean values of blocks of previously stored image of the same parking position. In a further aspect, a moving region is checked to determine if it is gray colored or not by computing the pixel chrominance values in the Y-Cb-Cr color space, where the pixel chrominance values must be close to zero. Also, it is an aspect of the invention if smoothness of the gray colored moving region is checked by using an edge detector which should not detect any edges in the region. Another aspect of the invention is use of a support vector machine to determine if a region is smoke or not based on the color, motion and edge parameters estimated from the video.

It is also an aspect of this implementation to minimize nuisance alarms from gray colored regions in the viewing range of the camera. This can be accomplished by a color analysis that identifies such regions during system installation, where such regions may be given a low priority or ignored during operation of the system. Another aspect of the invention is to provide a learning period for the system, and when a nuisance alarm occurs giving the user the option of excluding the the region from further analysis.

A further implementation of the invention is a computer readable medium having computer readable program code embodied in program modules therein, where the computer readable program code causes processing circuitry to detect wildfires using a visible range pan-tilt-zoom camera continuously scanning the 360 degree viewing angle. An edge detector for determining gray colored smooth regions in the current image of the video generated by the pan-tilt-zoom camera is employed in one program module; another program module determines if the gray colored region is a moving region in video; there is a program module for segmenting the current image of the video into the sky and the land regions, and checking if the moving region is in the sky region or touches said land regions of the image; and there is a program module for using a support vector machine based decision making algorithm.

In another aspect of this implementation of the invention, the software modules in the computer readable medium define a smooth region as a region with small pixel value transitions which are determined as regions in which an image edge detector cannot detect any significant edges. It is also an aspect of this implementation for the smooth region to be defined as a region with soft pixel value transitions which are determined as regions in which an image edge detector cannot detect any significant edges. In another aspect a Sobel operator is used for edge detection. In a further aspect, a gray region in an image is defined as a region whose pixel chrominance values are close to zero in the Y-Cb-Cr color space.

In another aspect of this implementation the pan-tilt-zoom camera automatically stops whenever a gray colored smooth region is detected in the current image of the video. It is also an aspect of this implementation to have consecutive images of the video subtracted from each other to determine if the gray colored smooth region is moving or not. In a preferred mode, the time difference between consecutive images is long enough (e.g. between one and two seconds) to detect the relatively slow movement of smoke. In another aspect, a support vector machine determines if a region is smoke or not based on the color, motion and edge parameters estimated from the video.

Another implementation of the invention is a computer readable medium having computer readable program code that causes processing circuitry to detect wildfires using a visible range pan-tilt-zoom camera to generate images. The current image of the parking position of the pan-tilt-zoom camera is compared with a previous image to determine a difference image. The time difference between images should be long enough to detect movement in smoke. An an edge detector is employed to determine gray colored smooth regions in the current image. The current image of the video is segmented into the sky and the land portions, and the moving region is checked to see if it is in the sky portion or touches said land portion of the image. A support vector based decision making algorithm is used to determine if the moving region is smoke.

In a further aspect of this implementation the pan-tilt-zoom camera scans the surrounding area by visiting user defined parking positions. Also, moving regions may be determined by taking the difference between the mean values of blocks of the current image of the video and the mean values of blocks of previously stored image of the same parking position. In a further aspect, a moving region is checked to determine whether it is gray colored or not by computing the pixel chrominance values in the Y-Cb-Cr color space, where the pixel chrominance values must be close to zero. In yet another aspect of this implementation, smoothness of the gray colored moving region is checked by using an edge detector which should not detect any edges in the region. It is also an aspect of this implementation of the invention to construct a covariance matrix from the smoke pixels, including color information in the matrix together with first and second derivatives of smoke pixels. A support vector machine is used to determine if a region is smoke or not, based on the color, motion and edge parameters estimated from the video.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
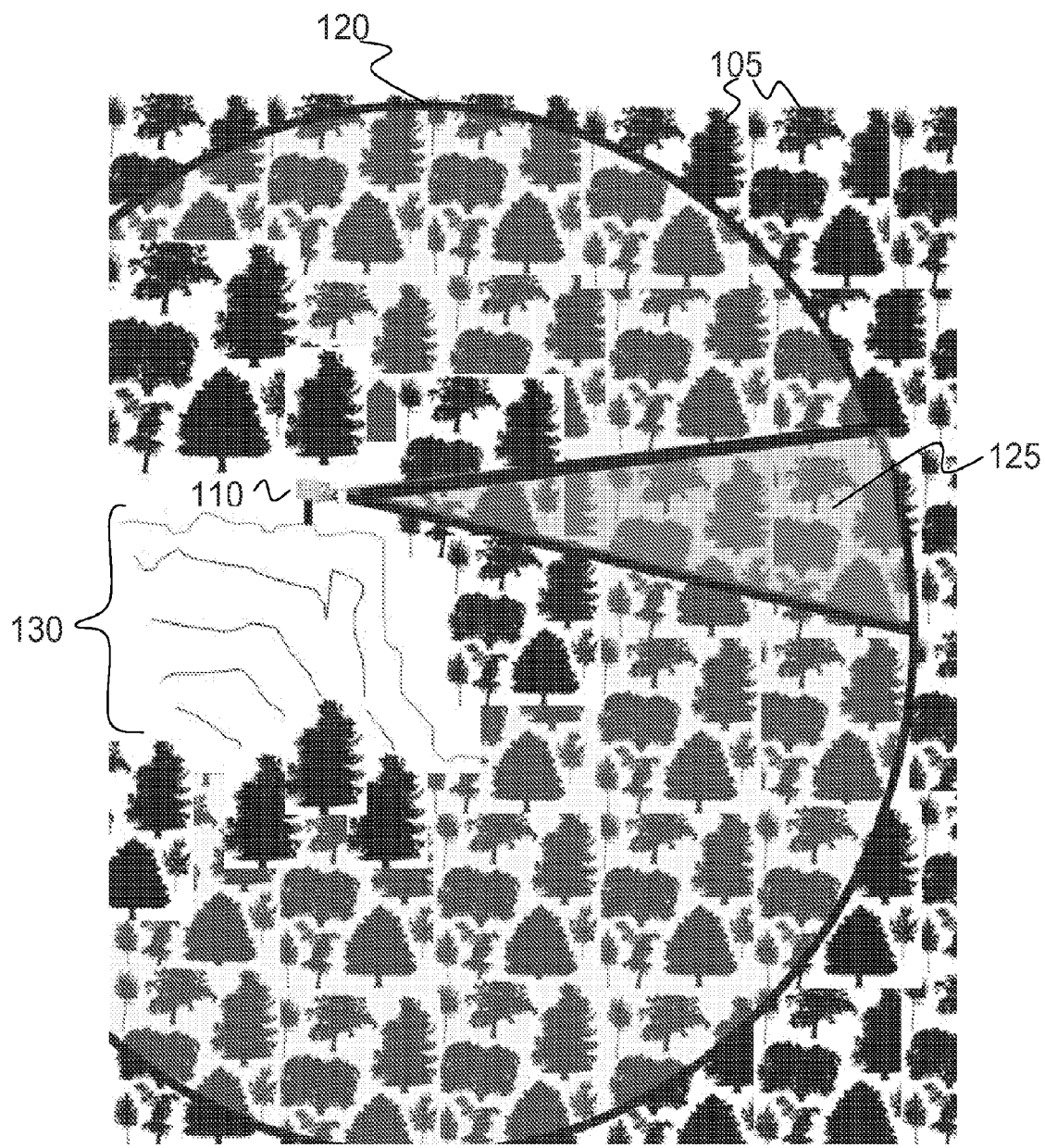
FIG. 1 is two dimensional schematic diagram of a forest area monitored for fires by a camera and system of the present invention.

The method and a system of the invention uses a visible range Pan-Tilt-Zoom (PTZ) camera for wildfire detection and it is based on computer vision. In many forests, there are lookout towers for wildfire smoke detection and security guards monitor the surrounding area for wildfires. Security guards use naked eye and/or binoculars to monitor the visible range. Therefore PTZ cameras 110 can be placed on lookout towers, hilltops, communications towers or dedicated poles to monitor the surrounding zone as well, as shown in FIG. 1.

The PTZ camera continuously scans the 360 degree viewing angle (represented by partial arc 120) and sends a video containing image frames to a computer. The video is then analyzed by a computer or a digital signal processor. The method and a system of the invention is based on detecting smoke in video because smoke arises first in wildfires and becomes visible over the trees or bush from long distances.

The PTZ camera may scan the 360 degree range in two ways. In the first case the user may define specific camera parking positions (e.g. angular section 125) and determines the zoom factors for each region. Afterwards, the PTZ camera visits the user defined parking positions in a sequential manner. In the second case, the camera may automatically determine the parking positions by itself. The camera starts with a specific parking position, then moves clockwise (or counter-clockwise) until there is no overlap between the current image of the video and the image of the previous position. In this way, it covers the 360 degrees. It will be noted that FIG. 1 is a two dimensional representation of a forested terrain characterized by trees 105, and this terrain may have significant vertical variations represented schematically by contour lines 130. Thus a complete set of camera frame images covering the full 360 degree view of the forest visible from the vantage point of camera 110 may require for each pan position a plurality of tilts and zooms. For example, the camera may tilt its head down and repeat the 360 degree coverage for a watch tower located on a steep hill top.

The main steps of the intelligent video analysis are summarized in FIG. 2 as follows:

The gray colored regions are detected 210 in each image frame 205 of the video.

An edge detector is used to detect 220 whether the gray colored region is a smooth region or not. This is because wildfire smoke is smoother than the regular wildland background consisting of trees, ridges, houses and other man-made objects etc.

The next step is to determine 230 if the gray colored region is a moving region in video or not. Wildfire smoke moves in a very slow manner in most cases because the distance between the camera and the smoke usually is in the order of kilometers. Therefore a standard video motion detection routine subtracting the current image $I_n$ of the video from the previous one cannot be used as the frame capture rate of a typical video ranges from 4 frame per second to 25 fps. Therefore a slow moving object may be missed by frame differencing. Therefore a frame differencing method using frames between one and two second apart ($I_{n-k}$ 225) should be used for slow moving object detection.

Clouds and wildfire smoke are similar in nature because they both contain water vapor. Clouds also move slowly. Therefore, the sky and the land regions of the image frames of the video should be segmented from each other, and a check is made to determine 240 if the smooth gray region is connected to the land. If the slow moving region is in the sky region then it should be ignored. If the moving region touches the land part of the image it should be considered as a candidate region for smoke.

The final step of the method is to construct 250 a covariance matrix of the region and then to use a decision engine to determine 260 if the pixels of the slow moving region are due to wildfire smoke 265 or not by using a support vector machine.

Figure 2:
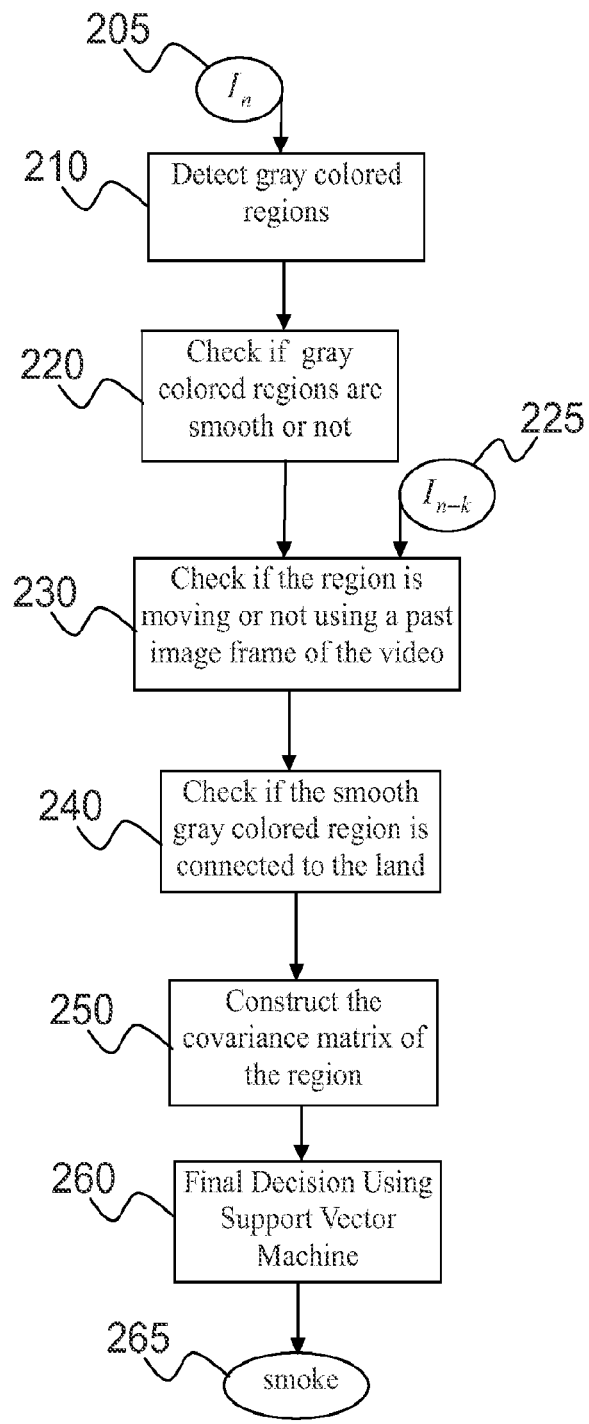
FIG. 2 is a flow chart showing the method of the present invention.
Figure 3:
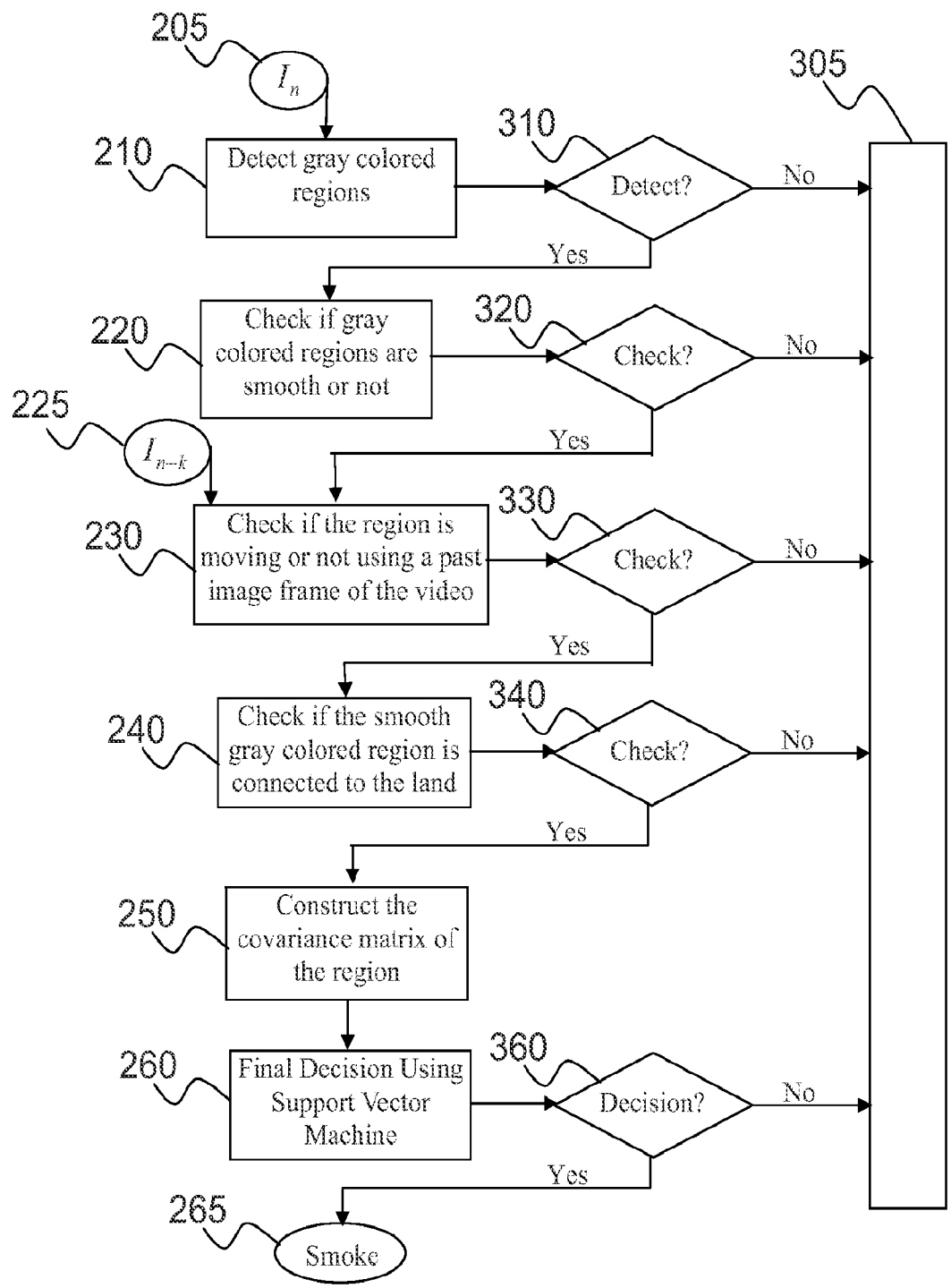
FIG. 3 is a decision flow diagram showing the method of the invention.

Thus FIG. 2 summarizes the main steps of a computer vision based wildfire smoke detection algorithm in accordance with the invention. In what follows we describe the main features of the method and the system, with further reference to FIG. 3 and FIG. 4.

Gray Colored Region Detection 210:

A typical PTZ camera provides image frames (or simply images) in JPEG format or in one of the MPEG video representation formats. The JPEG and MPEG video provides data in YUV, YCbCr or in Red, Green, Blue (RGB) formats. If the pixel values are in RGB format it has to be converted into Y-Cb-Cr format as follows:

$$Y=16+(65.481*R+128.553*G+24.966*B)$$

$$Cb=(-37.797*R-74.203*G+112.0*B)$$

$$Cr=(112.0*R-93.786*G-18.214*B)$$

with the assumption that R, G and B values are scaled to the range of [0, 1]. Y represents the luminance or gray value of the pixel. Cb and Cr are called the chrominance values of the color pixel. In some definitions 128 is added to Cb and Cr so that dynamic range of Cb and Cr lie between 0 and 256. White colored pixels have Cb and Cr values equal to or very close to 0 and a Y value above 200. Dark gray pixels have Cb and Cr values equal to or close to 0 and a Y value close to zero.

A group of pixels is classified 310 as a gray colored region if they are connected and their |Cr| and |Cb| values are below a threshold.

Smooth Region Detection 220:

Smoothness of an image region is determined 320 using an edge detection operator. There are many edge detection operators in the literature. In a preferred embodiment of the method and the system of the invention we use the Sobel operator:

Let A be the current image, and $G_x$ and $G_y$ are the corresponding horizontal and vertical derivative approximation masks which are obtained as follows:

$$G_y = \begin{bmatrix} +1 & +2 & +1 \\ 0 & 0 & 0 \\ -1 & -2 & -1 \end{bmatrix} * A \text{ and } G_x = \begin{bmatrix} +1 & 0 & -1 \\ +2 & 0 & -2 \\ +1 & 0 & -1 \end{bmatrix} * A$$

where * denotes the 2-dimensional convolution operation.

At each pixel location in the image A, the resulting gradient approximations can be combined to give the gradient magnitude as follows:

$$G=\sqrt{G_x^2+G_y^2}$$

Or, $G=|Gx|+|Gy|$.

In practice, images are filtered using the above masks to determine the edges. In this preferred embodiment of the method and system of the invention, we filter the gray colored regions using a Sobel operator and if we detect an edge then we ignore the gray colored region because at the early stages of fire the smoke has an almost flat gray color. Another measure of the smoothness is the sum of absolute values of Sobel filter output in a given region. If the sum of absolute values is less than a threshold the region is assumed to be smooth. Alternatively, instead of a sum of absolute values the sum of squares of the Sobel filter output can be used to determine 320 the smoothness. When the sum of squares of the Sobel filter output is less than a threshold the region is assumed to be smooth.

Slow Moving Region Detection 230:

Once a gray colored smooth image region is detected it is verified whether it is moving or not. A sample image frame of the video and the pixel locations of the gray colored smooth regions are stored in the analysis computer or the digital signal processor. The camera moves to another angle to monitor a different region. The gray colored smooth regions are detected in the new location. After this the camera moves back to the first position and the current image of the video is subtracted from the image stored in the computer. The two image frames are at least one second apart from each other because it may take some time for the camera to stabilize itself when it moved to a new location.

As described above, wildfire smoke moves in a very slow manner in most cases because the distance between the camera and the smoke usually is in the order of kilometers. Therefore a standard video motion detection routine subtracting the current image $I_n$ 205 of the video from the previous one cannot be used as the frame capture rate of a typical video ranges from 4 frame per second to 25 fps. Therefore a slow moving object may be missed by frame differencing. Therefore a frame differencing method using frames between one and two second apart ($I_{n-k}$ 225) should be used for slow moving object detection.

Figure 4:
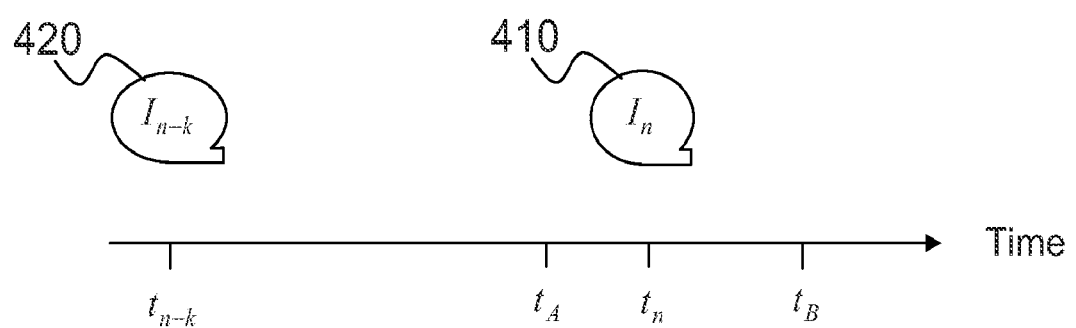
FIG. 4 is a diagram of a slow moving time range between image frames used to detect movement in smoke.

This frame differencing method may be understood with reference to FIG. 4. Image $I_n$ 410 is taken at time $t_n$. A past image $I_{n-k}$ 420, taken at time $t_{n-k}$, must be found such that $t_A < t_n < t_B$, where the difference $t_A - t_{n-k}$ is the lower bound of a slow moving time range and the difference $t_B - t_{n-k}$ is the upper bound of the slow moving time range. In the above described embodiment the lower bound of the slow moving time range is one second and the upper bound is two seconds, although those skilled in the art will understand that these bounds may be adjusted as appropriate to accommodate factors affecting the appearance of motion in smoke, in light of camera resolution, the distance between the camera and the terrain being imaged, and the strategy for scanning the terrain within the field of view of the camera. The strategy for scanning controls the sequence of images so that there will be a past image $I_{n-k}$ 420 that is within a slow moving time range of image $I_n$ 410.

If the smooth gray colored region moves we observe that pixel values are different from each other, which indicates 330 motion. When there is no motion we ignore the gray colored region and do not process the corresponding pixels further.

One of the problems with the above described technique for obtaining past images $I_{n-k}$ 225, 420 that are within a slow moving time range is that the camera may not move to the exact original location because of mechanical inaccuracies. When there is even a pixel shift due, to mechanical problems objects may appear to be moving. In order to overcome this problem we divide the image into pixel blocks of 8 by 8 or 16 by 16 and compute the mean value of blocks. Other block sizes can be also used. The two images are compared to each other using the mean values of blocks. When there is a change in the mean value of a block we assume that the block of pixels is a moving block.

When the gray colored object is a fast moving object such as a bird, a plane etc it will not be apparent in the new image separated by a time difference that is at least the lower bound of a slow moving time range. Therefore, we check the number of gray colored pixels in the new image. If there is a decrease we also ignore the detected smooth gray colored region. The number of smoke colored pixels in the near vicinity of the original location should increase over time in case of fire.

One of the main sources of nuisance alarms is gray (smoke colored) areas in the viewing range of the camera. Gray colored regions are usually rocks and roads etc. Therefore it is highly unlikely that they cause real alarms. On the other hand when a camera shakes in the wind gray colored regions appear to be moving in video. One can detect such areas using color information of image frames of the video beforehand during system installation and assign low priority or ignore such regions during video analysis.

Another way to eliminate such regions is to allow the wildfire detection system a learning period. Whenever a nuisance alarm is produced the system may ask the user to exclude the alarm region from further analysis. In this way, a region of interest (roi) is determined for each preset of the camera during the learning period.

Cloud vs Smoke Analysis 240:

Clouds cause false alarms in many computer vision systems. Since early wildfire smoke also contains water vapor due to the water in plants, clouds and wildfire smoke can be confused even by human observers. Therefore, the method and the system of the invention segments the image into sky and land regions. To determine the boundary of the sky a vertical high-pass filter with filter coefficients $$h[n] = \left\{ \frac{1}{32}\ 0\ \frac{-9}{32}\ \frac{1}{2}\ \frac{-9}{32}\ 0\ \frac{1}{32} \right\}$$

is used. Each column of the image is filtered one by one starting from the top. In a flat line of pixels this filter should produce zero output. In sky regions it produces small values close to zero. Whenever it hits the land boundary the filter produces a significantly larger value. Therefore we can automatically detect the starting pixel location of the land region when we filter the image from the top part of the image frame.

Another distinguishing feature of the sky region is the blue components of pixels. Therefore the vertical filtering is preferably done over the blue component of the image instead of the (Y) luminance component.

The sky-land boundary detection is done only once for a given position of the camera. It doesn't have to be repeated whenever the camera moves to a new location.

When a slow moving object is detected in the sky it is simply ignored. On the other hand if the gray colored slow moving object is detected in the land region or between the land and sky it is a cause of alarm 340 and pixels of that region are further processed by the decision engine.

Support Vector Machine Based Decision Engine 260:

Support vector machines (SVM) are widely used in practice for decision making in many computer vision problems. The SVM has to be trained with wild smoke data and non-smoke region data. The SVM determines a decision region in the feature space for wildfire smoke using the training data: Whenever the feature vector of an image region falls into the decision region of the SVM it produces a positive decision based on the feature vector.

Our feature vector is based on covariance of a given region. In other words we obtain a feature vector for each pixel of the smooth gray colored region. A region covariance matrix consisting of discriminative features is calculated for each region. For each pixel in the region, a 9-dimensional feature vector $z^k$ is calculated as:

$$z_k = \left[ x_1\ x_2\ Y(x_1, x_2)\ U(x_1, x_2)\ V(x_1, x_2) \left|\frac{dY(x_1, x_2)}{dx_1}\right| \left|\frac{dY(x_1, x_2)}{dx_2}\right| \left|\frac{d^2 Y(x_1, x_2)}{dx_1^2}\right| \left|\frac{d^2 Y(x_1, x_2)}{dx_2^2}\right| \right]^T$$

where k is the label of a pixel, $(x_1, x_2)$ is the location of the pixel, Y, U, V are the components of the representation of the pixel in YUV color space, $$\frac{dY(x_1, x_2)}{dx_1} \text{ and } \frac{dY(x_1, x_2)}{dx_2}$$

are the horizontal and vertical derivatives of the pixel, respectively, calculated using the filter [−1 0 1];

$$\frac{d^2 Y(x_1, x_2)}{dx_1^2} \text{ and } \frac{d^2 Y(x_1, x_2)}{dx_2^2}$$

are the horizontal and vertical second derivatives of the region calculated using the filter [−1 2 −1].

The feature vector for each pixel can be defined as follows:

$$z_k = [z_k(i)]^T$$

where i is the index of the feature vector. This feature vector is used to calculate the 9 by 9 covariance matrix of the regions using the fast covariance matrix computation formula:

$$C_R = [C_R(i, j)] = \left( \frac{1}{n-1} \left[ \sum_{k=1}^{n} z_k(i) z_k(j) - \frac{1}{n} \sum_{k=1}^{n} z_k(i) \sum_{k=1}^{n} z_k(j) \right] \right)$$

where, n is the total number of pixels in the region and $c_R(i, j)$ is the (i, j)th component of the covariance matrix.

The region covariance matrices are symmetric therefore we only need half of the elements of the matrix for classification. We also do not need the first three elements $c_R(1, 1)$, $c_R(2, 1)$, $c_R(2, 2)$ when using the lower diagonal elements of the matrix, because these are the same for all regions. Then, we need a feature vector $f_R$ with $$\frac{9 \times 10}{2} - 3 = 42$$

elements for each region. For a given region the final feature vector does not depend the number of pixels in the region, it only depends on the number of features in $z_k$.

During the training phase the SVM is trained using both the wildfire smoke images and cloud images, and gray colored land images, regular forest images etc. which define the negative part of the feature space.

One skilled in the art of computer systems and computer vision will understand that the present invention is not limited to a particular class or model of computer or digital signal processor or to the PTZ camera employed in the described embodiment.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for wildfire detection using a visible range video camera, the computer performing steps comprising:
    generating sequential video images of a subject area;
    detecting gray colored regions in one of the video images;
    determining if a gray colored region is smooth;
    determining if a gray colored smooth region is slow moving by a frame difference comparison between a video image containing the gray colored smooth region and a past video image that is within a slow moving time range of the video image;
    determining if a slow moving gray colored smooth region is connected to a land portion of the subject area;
    constructing a covariance matrix of a land connected slow moving gray colored smooth region; and
    applying a trained support vector machine to the covariance matrix to determine if the land connected slow moving gray colored smooth region is smoke from a wildfire.

2. The method of claim 1, wherein a gray colored region is detected by computing pixel chrominance values in Y-Cb-Cr color space and the computed values are close to zero.

3. The method of claim 2, wherein a gray colored region is determined to be smooth if an edge detector does not detect edges above a threshold value.

4. The method of claim 1, further comprising segmenting a video image into sky and land portions, wherein a detected region that touches a land portion is determined to be connected to a land portion.

5. The method of claim 1, wherein the covariance matrix is constructed from smoke pixels and contains color information and first and second derivatives of the smoke pixels.

6. The method of claim 1, further comprising a strategy for controlling scanning of the video camera to generate video images continuously within a 360 degree field of view of the camera.

7. The method of claim 6, wherein the camera automatically stops when a gray colored smooth region is detected.

8. The method of claim 1, wherein the support vector machine determines if a region is smoke or not based on the color, motion and edge parameters estimated from the video image.

9. The method of claim 1, wherein the visible range video camera is a pan-tilt-zoom (PTZ) camera.

10. The method of claim 6, wherein determining connection to a land portion is done by color analysis and a user has an option to exclude a sky region during scanning.

11. A computer implemented system for wildfire detection using a visible range video camera, comprising:
    means for generating sequential video images of a subject area;
    means for detecting gray colored regions in one of the video images;
    means for determining if a gray colored region is smooth;
    means for determining if a gray colored smooth region is slow moving by a frame difference comparison between a video image containing the gray colored smooth region and a past video image that is within a slow moving time range of the video image;
    means for determining if a slow moving gray colored smooth region is connected to a land portion of the subject area;
    means for constructing a covariance matrix of a land connected slow moving gray colored smooth region; and
    means for applying a trained support vector machine to the covariance matrix to determine if the land connected slow moving gray colored smooth region is smoke from a wildfire.

12. The system of claim 11, wherein a gray colored region is detected by computing pixel chrominance values in Y-Cb-Cr color space and the computed values are close to zero.

13. The system of claim 12, wherein a gray colored region is determined to be smooth if an edge detector does not detect edges above a threshold value.

14. The system of claim 11, further comprising means for segmenting a video image into sky and land portions, wherein a detected region that touches a land portion is determined to be connected to a land portion.

15. The system of claim 11, wherein the covariance matrix is constructed from smoke pixels and contains color information and first and second derivatives of the smoke pixels.

16. The system of claim 11, further comprising means for controlling scanning of the video camera to generate video images continuously within a 360 degree field of view of the camera.

17. The system of claim 16, wherein the camera automatically stops when a gray colored smooth region is detected.

18. The system of claim 11, wherein the support vector machine determines if a region is smoke or not based on the color, motion and edge parameters estimated from the video image.

19. The system of claim 11, wherein the visible range video camera is a pan-tilt-zoom (PTZ) camera.

20. The system of claim 16, wherein the means for determining connection to a land portion performs color analysis and a user has an option to exclude a sky region during scanning.

* * * * *